United States Patent
Yamamoto

(10) Patent No.: US 12,466,309 B2
(45) Date of Patent: Nov. 11, 2025

(54) CORNERING LIGHT STRUCTURE FOR SADDLE-RIDE TYPE VEHICLE

(71) Applicant: HONDA MOTOR CO., LTD., Tokyo (JP)

(72) Inventor: Chiaki Yamamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 18/211,745

(22) Filed: Jun. 20, 2023

(65) Prior Publication Data

US 2023/0406198 A1    Dec. 21, 2023

(30) Foreign Application Priority Data

Jun. 21, 2022   (JP) ................................. 2022-099493

(51) Int. Cl.
*B60Q 1/24*      (2006.01)
*B60Q 1/00*      (2006.01)
*B62J 45/415*    (2020.01)

(52) U.S. Cl.
CPC ........... *B60Q 1/249* (2022.05); *B60Q 1/0023* (2013.01); *B62J 45/4151* (2020.02)

(58) Field of Classification Search
CPC ... B62J 45/41; B62J 6/026; B62J 6/027; B62J 45/20; B62J 45/4151; B62J 45/422; B60Q 1/0094; B60Q 1/0683; B60Q 1/1423; B60Q 1/381; B60Q 1/0483; B60Q 2300/134
See application file for complete search history.

(56) References Cited

U.S. PATENT DOCUMENTS

2019/0283659 A1   9/2019  Moerbe
2020/0290694 A1*  9/2020  Yamasaki ................ B62J 6/025
(Continued)

FOREIGN PATENT DOCUMENTS

EP      2489549         8/2012
EP      2965975         1/2016
JP      2010-149836     7/2010
(Continued)

OTHER PUBLICATIONS

Title: Headlight system for use in vehicle that leans intoturns, vehicle that leans into turns, and a method for controlling a headlight system: Title:JPH02182549 Pub: Oct. 22, 2014; p. 1-28 (Year: 2014).*

(Continued)

*Primary Examiner* — Wei (Victor) Y Chan
(74) *Attorney, Agent, or Firm* — Amin, Turocy & Watson, LLP

(57) ABSTRACT

This cornering light structure for a saddle-ride type vehicle which is provided in the saddle-ride type vehicle that performs cornering by a vehicle body being banked laterally and which widens an illumination range in a direction in which the vehicle body is banked during the cornering, the cornering light structure includes a bank angle detection means for detecting a bank angle of the vehicle body, and a light body that illuminates a range in the direction in which the vehicle body is banked according to the bank angle detected by the bank angle detection means, in which the light body and the bank angle detection means constitute an integrated light unit.

5 Claims, 11 Drawing Sheets

(56) References Cited

U.S. PATENT DOCUMENTS

2021/0300363 A1\* 9/2021 Maeda ................... B62J 45/41
2023/0311742 A1 10/2023 Sekine

FOREIGN PATENT DOCUMENTS

| | | |
|---|---|---|
| JP | 2016-016772 | 2/2016 |
| JP | 2016-531046 | 10/2016 |
| JP | 2017-171052 | 9/2017 |
| JP | 2020-006876 | 1/2020 |
| JP | 2020-500766 | 1/2020 |
| JP | 2023-149959 | 10/2023 |
| WO | 2015/038348 | 3/2015 |

OTHER PUBLICATIONS

Japanese Office Action for Japanese Patent Application No. 2022-099493 mailed Apr. 16, 2024.
Japanese Office Action for Japanese Patent Application No. 2022-099493 mailed Nov. 28, 2023.

\* cited by examiner

CORNERING LIGHT STRUCTURE FOR SADDLE-RIDE TYPE VEHICLE

CROSS-REFERENCE TO RELATED APPLICATION

The present application claims priority based on Japanese Patent Application No. 2022-099493, filed Jun. 21, 2022, the content of which is incorporated herein by reference.

BACKGROUND OF THE INVENTION

Field of the Invention

The present invention relates to a cornering light structure for a saddle-ride type vehicle.

Description of Related Art

In the related art, there is known a cornering light that detects a bank angle of a saddle-ride type vehicle using a gyro sensor such as an IMU and widens an illumination range in a traveling direction (a turning direction) on a bank side (see Japanese Unexamined Patent Application, First Publication No. 2020-006876, for example).

SUMMARY OF THE INVENTION

However, in the cornering light of the related art, a light body is built into a vehicle body, and it is necessary to form an opening for the light body in a vehicle body exterior or provide a structure for attaching the light in the vehicle body exterior. With such a configuration, special components and special designs are required for expansion to other models, which has been a factor of an increase in cost.

An object of an aspect of the present invention is to provide a cornering light structure for a saddle-ride type vehicle which curbs an increase in cost and facilitates expansion to other models.

In order to achieve the above object, a cornering light structure for a saddle-ride type vehicle according to an aspect of the present invention employs the following configurations.

(1) According to an aspect of the present invention, there is provided a cornering light structure for a saddle-ride type vehicle which is provided in the saddle-ride type vehicle that performs cornering by a vehicle body being banked laterally and which widens an illumination range in a direction in which the vehicle body is banked during the cornering, the cornering light structure including: a bank angle detection means for detecting a bank angle of the vehicle body; and a light body that illuminates a range in the direction in which the vehicle body is banked according to the bank angle detected by the bank angle detection means, wherein the light body and the bank angle detection means constitute an integrated light unit.

According to the above aspect (1), compared to a configuration in which the cornering light is incorporated in a vehicle body component, retrofitting an optional part is facilitated, and thus an increase in cost can be curbed and expansion to other models can be facilitated. Further, the light body and the bank angle detection means constitute the integrated light unit, and thus the cornering light can be easily set as an option and can be easily attached to the vehicle body.

(2) In the above aspect (1), the light body and the bank angle detection means may be attached to a same member.

According to the above aspect (2), the light body and the bank angle detection means share the same member, and thus an integrated light unit can be easily configured.

(3) In the above aspect (1) or (2), the light unit may be attached to a lateral center of the vehicle body.

According to the above aspect (3), the bank angle of the vehicle body can be detected efficiently by arranging the light unit including the bank angle detection means at the lateral center of the vehicle body.

(4) In the above aspect (1) or (2), the light unit may have a detection portion of the bank angle detection means at a lateral center of the vehicle body and at least one light body on each of both left and right sides of the detection portion.

According to the above aspect (4), the detection portion of the bank angle detection means is disposed at the lateral center of the vehicle body, and the light bodies are disposed at both left and right sides of the vehicle body, and thus it is possible to efficiently and easily detect the bank angle of the vehicle body, and it is possible to easily illuminate a range in the bank direction of the vehicle body.

(5) In the above aspect (1) or (2), the saddle-ride type vehicle may include a frame member attached separately to the vehicle body, and the light unit may be attached to the frame member.

According to the above aspect (5), by attaching the light unit to the frame member which is widely disposed on the outside of the vehicle body, the degree of freedom in the arrangement of the light unit can be increased, the attachment can be facilitated, and the versatility of the cornering light can be enhanced to reduce the cost.

According to the aspect of the present invention, it is possible to provide a cornering light structure for a saddle-ride type vehicle which curbs an increase in cost and facilitates expansion to other models.

DESCRIPTION OF EMBODIMENTS

Figure 1:
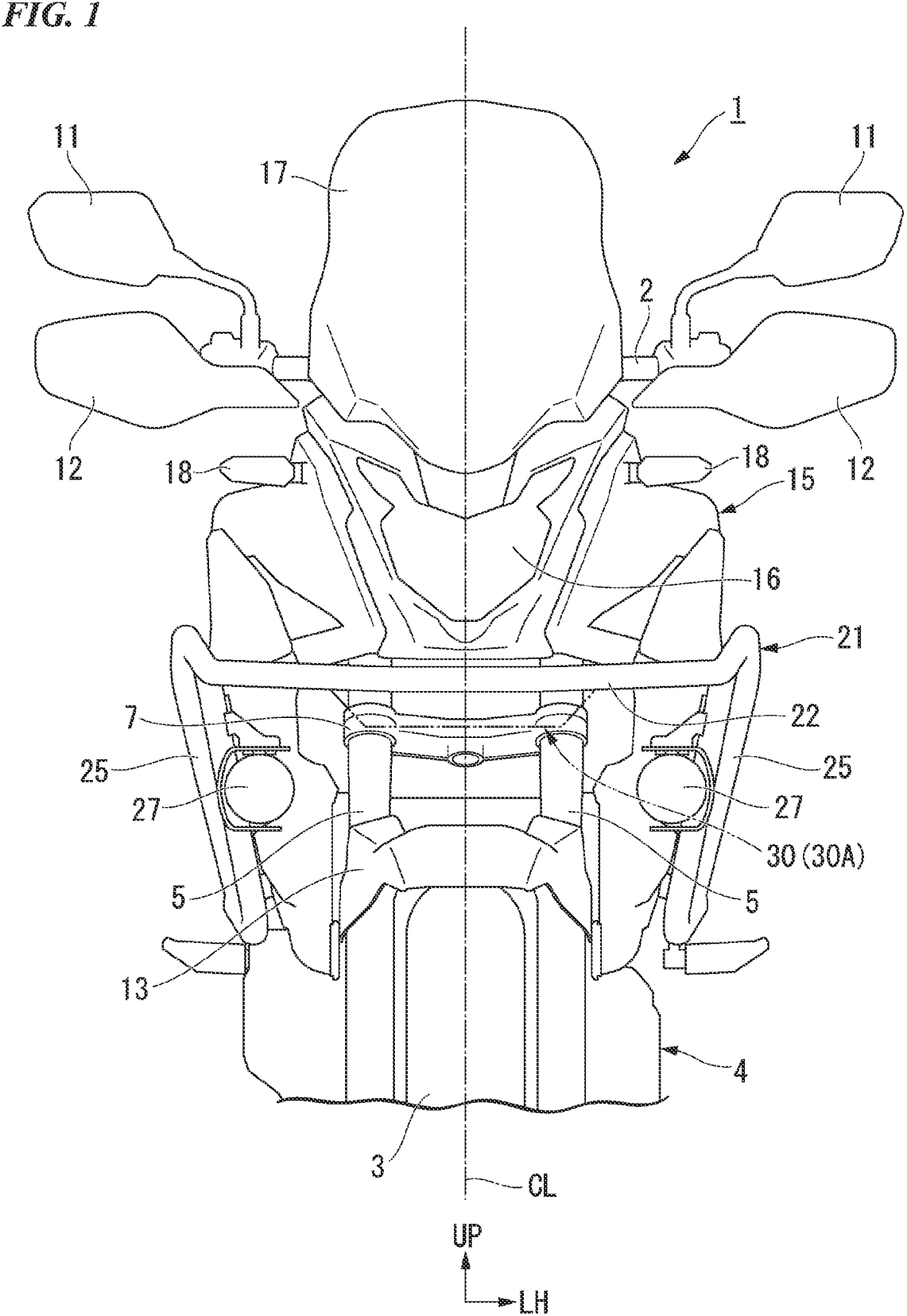
FIG. 1 is a front view of a motorcycle according to a first embodiment of the present invention.

Hereinafter, embodiments of the present invention will be described with reference to the drawings. Front, rear, left, and right directions in the following description are the same as directions in a vehicle described below unless otherwise specified. Further, an arrow FR indicating a forward direction with respect to the vehicle, an arrow LH indicating a left direction with respect to the vehicle, an arrow UP indicating an upward direction with respect to the vehicle, and a line CL indicating a lateral center of a vehicle body are shown at appropriate places in the drawings used in the following description.

First Embodiment

FIG. 1 is a front view of a motorcycle 1 employing a cornering light 30 according to a first embodiment of the present invention. The motorcycle 1 shown in FIG. 1 is a so-called adventure saddle-ride type vehicle designed for traveling on not only paved roads but also unpaved roads.

The motorcycle 1 includes a front wheel 3 steerable by a bar-type steering handlebar 2, a power unit 4 including an internal combustion engine and the like, and a rear wheel (not shown) driven by the power unit 4. The motorcycle 1 is an example of a saddle-ride type vehicle in which a rider straddles the vehicle body. In the motorcycle 1, it is possible to swing (bank) the vehicle body in a left-right direction (a roll direction) with reference to ground contact points of the front and rear wheels.

The motorcycle 1 rotatably supports steering system components including a pair of left and right front forks 5 on a head pipe (both not shown) located at the front end portion of a vehicle body frame. The pair of left and right front forks 5 each constitute a telescopic shock absorber. The front wheel (a steering wheel) 3 is supported at the lower end portions of the pair of left and right front forks 5. Upper portions of the pair of left and right front forks 5 are connected to each other by a top bridge (not shown) and a bottom bridge 7. The steering handlebar 2 is supported on the top bridge.

A pair of left and right rearview mirrors 11, a pair of lever guards 12, and the like are attached to the steering handlebar 2. The rearview mirror 11 enables a rider to visually recognize the rear of the vehicle, and the lever guard 12 curbs disturbance to an operation lever attached to the steering handlebar 2. A front fender 13 covering an upper portion of the front wheel 3 is supported by the pair of left and right front forks 5.

A front portion of the vehicle body of the motorcycle 1 is covered with a front cowl 15. A headlight 16 is disposed at the lateral center of the front end portion of the front cowl 15. A windscreen 17 is disposed above the headlight 16. A pair of left and right front blinkers 18 are disposed on both left and right sides of the front cowl 15.

Figure 2:
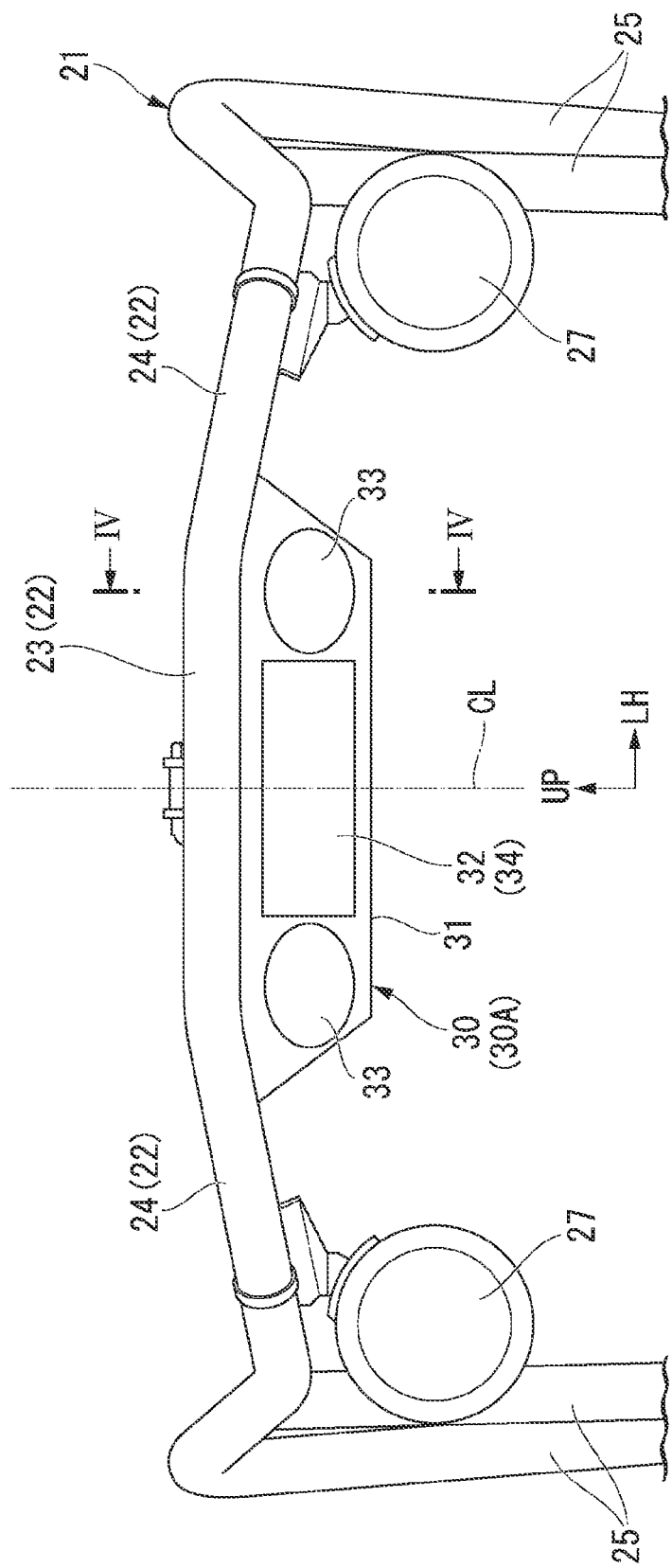
FIG. 2 is a front view of a guard pipe and a cornering light unit of the motorcycle.

Also referring to FIG. 2, a guard pipe (a frame member) 21 is disposed around the front cowl 15 to follow the outer surface of the front cowl 15. The guard pipe 21 is formed by bending a round pipe made of a metal such as aluminum to follow the outer shape of the front cowl 15. The guard pipe 21 integrally includes a front pipe portion 22 extending on the front side of the front cowl 15 and a pair of left and right side pipe portions 25 extending on the left and right sides of the front cowl 15.

The front pipe portion 22 integrally includes a front end straight portion 23 extending straight in the left-right direction across the lateral center of the vehicle body at the front end position of the guard pipe 21, and a pair of left and right side inclined portions 24 that bend and extend after being inclined from the left and right ends of the front end straight portion 23 toward the side pipe portions 25. A pair of left and right fog lights 27 are supported below the left and right side inclined portions 24. The pair of left and right fog lights 27 are disposed outside the left and right front forks 5 in a vehicle width direction and inside the left and right side pipe portions 25 in the vehicle width direction when viewed from the front of the vehicle.

For example, a cornering light 30 is disposed below the headlight 16. The cornering light 30 is turned on according to a lean (bank) angle to illuminate a range in a turning direction when the motorcycle 1 is cornering. For example, the cornering light 30 is supported below the front end straight portion 23 of the guard pipe 21.

Figure 3:
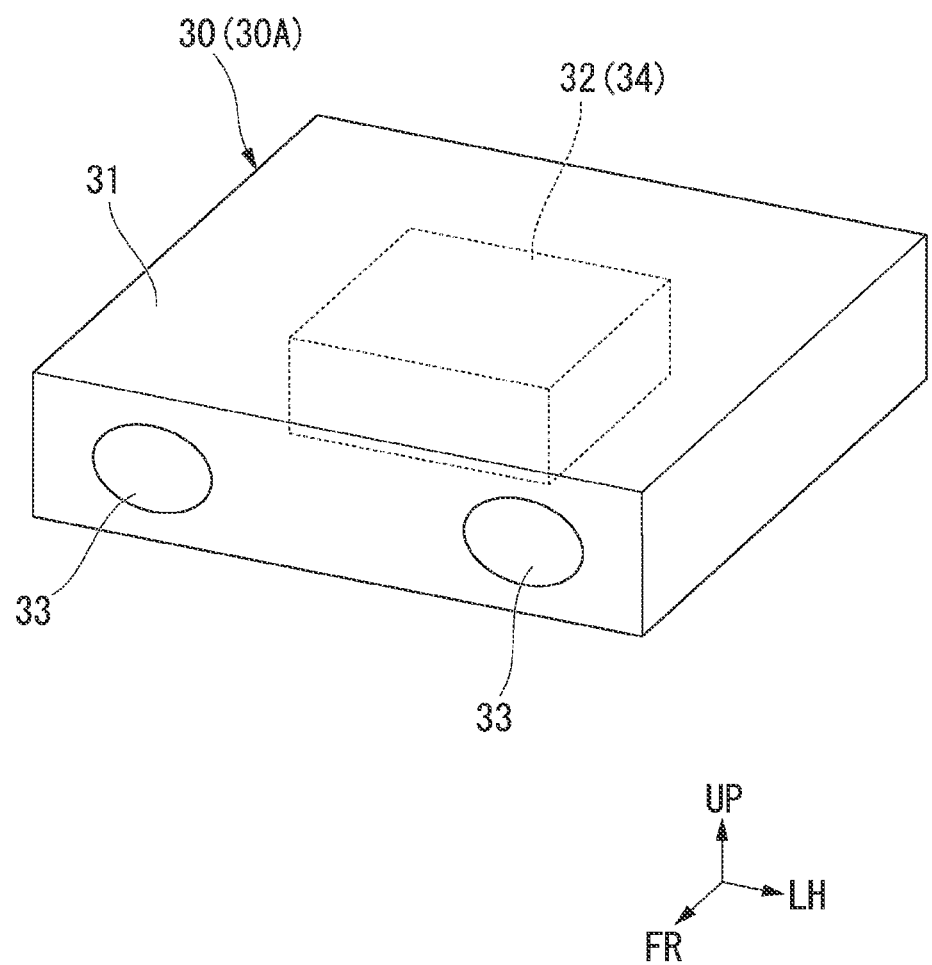
FIG. 3 is a perspective view showing a schematic configuration of the cornering light unit.
Figure 4:
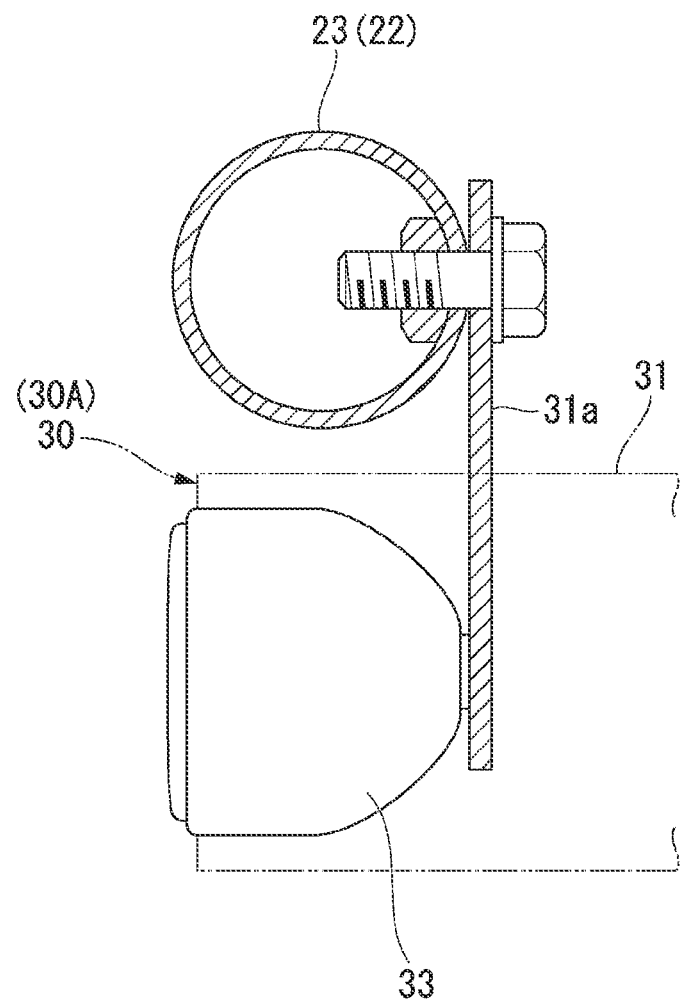
FIG. 4 is a cross-sectional view along line IV-IV of FIG. 2.

Also referring to FIGS. 3 and 4, the cornering light 30 accommodates an acceleration sensor (a detection portion) 32 for detecting a bank angle and a pair of left and right light bodies 33 in an integrated case 31. The cornering light 30 of the embodiment is configured as an integrated unit (hereinafter referred to as a light unit 30A in some cases) including the bank angle sensor (the acceleration sensor 32) and the pair of left and right light bodies 33. The cornering light 30 turns on the right light body 33 when the vehicle body leans to the right side and turns on the left light body 33 when the vehicle body leans to the left side.

However, in a case where the cornering light 30 is attached to the front side of the vehicle body, it is possible to illuminate a range in the traveling direction from a higher position by turning on the light body 33 on a side opposite to a bank direction.

The case 31 has, for example, a flat shape with a reduced vertical thickness. The case 31 is supported with respect to the front end straight portion 23 of the guard pipe 21 such that an angle in a vertical direction can be adjusted (that is, an optical axis can be adjusted).

In FIG. 4, the case 31 and the light body 33 are supported via a stay 31a extending in the vertical direction as an attachment structure of the cornering light 30.

The acceleration sensor 32 is disposed at the lateral center of the vehicle body and detects acceleration acting on the vehicle body. A detection signal of the acceleration sensor 32 is output to an ECU 40 which will be described later. The acceleration sensor 32 and the ECU 40 constitute bank angle detection means 34 for detecting the bank angle of the vehicle body.

The acceleration sensor 32 may be a 5-axis or 6-axis inertial measurement unit (IMU). The acceleration sensor 32 detects angular velocities of three axes (a roll axis, a pitch axis, and a yaw axis) in the vehicle body. The ECU 40 estimates an angle and an acceleration from the detection result of the acceleration sensor 32. A tilt sensor that detects the bank angle of the vehicle body may be used instead of the acceleration sensor 32. At least a part of the ECU 40 (a cornering determination unit 45 or the like) may be accommodated in the case 31, or may be attached to the vehicle body separately from the unit.

If the motorcycle 1 is equipped with an acceleration sensor for controlling the power unit 4 or the like, the light body 33 may be provided with a light control circuit, and the light body 33 may be turned on by receiving a detection signal from the existing acceleration sensor.

<Lighting Control System>

Figure 5:
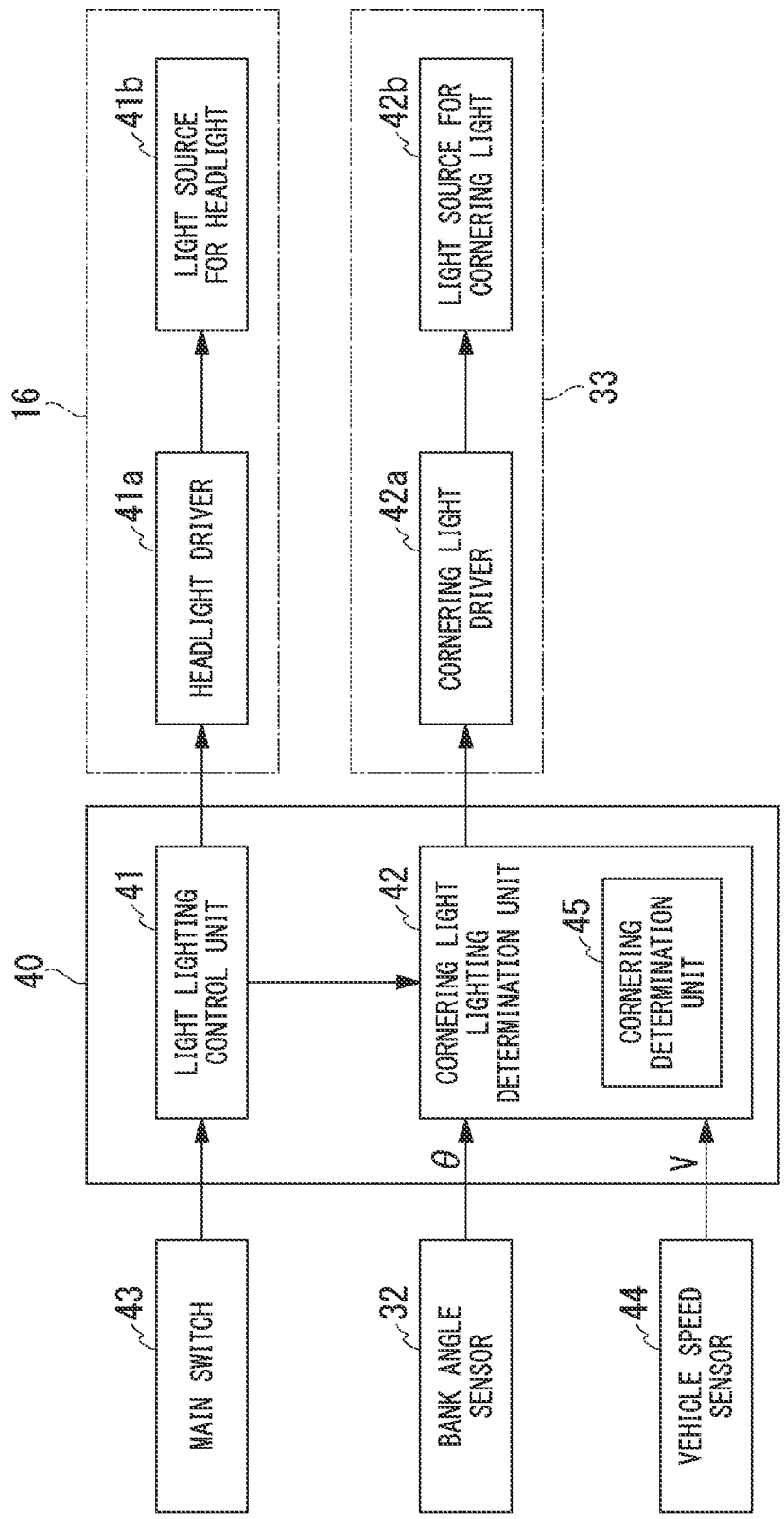
FIG. 5 is a block diagram showing a configuration of a lighting control system of a cornering light.

FIG. 5 is a block diagram showing a configuration of a lighting control system of the cornering light 30.

The electronic control unit (ECU) 40 of the cornering light 30 includes a light lighting control unit 41 and a cornering light lighting determination unit 42. In a case where the headlight 16 is of the constant lighting type, the light lighting control unit 41 transmits a drive command to a headlight driver 41a in accordance with an ON operation of a main switch 43 of the motorcycle 1 to turn on a headlight light source 41b. The cornering light lighting determination unit 42 performs lighting determination of the cornering light 30 only while the light lighting control unit 41 is being driven. When the cornering determination is made, the cornering light lighting determination unit 42 transmits a drive command to a cornering light driver 42a to turn on a cornering light source 42b.

The lighting control system may be provided separately from the cornering light 30.

The cornering light lighting determination unit 42 includes a cornering determination unit 45. The cornering determination unit 45 determines whether or not the motorcycle 1 is cornering according to the bank angle detected by the acceleration sensor 32 and a vehicle speed detected by a vehicle speed sensor 44. The cornering determination unit 45 performs cornering determination in a case where the vehicle speed is equal to or greater than a predetermined value and the bank angle is equal to or greater than a predetermined value. At this time, the cornering light lighting determination unit 42 turns on either the left or right cornering light source.

When the vehicle body leans during cornering, the illumination range formed on the road surface by the headlights 16 moves in a direction opposite to the turning direction. The cornering light 30 according to the present embodiment uses a light source that is independent from the headlight 16 to compensate for an insufficient illumination range in the turning direction during cornering.

For example, in the cornering light 30, a plurality of light sources may be disposed side by side sequentially from the inside in the vehicle width direction. At this time, for example, the number of lighting may be controlled to increase from the inside toward the outside in the vehicle width direction as the bank angle increases. Further, for example, the number of lighting is fixed to one, only a lighting position may be switched as the bank angle increases, or a light source on the inside in the vehicle width direction is dimmed as a light source on the outside in the vehicle width direction is turned on.

A more specific configuration of the cornering light 30 of the first embodiment will be described below with reference to FIGS. 6 to 10.

Figure 9:
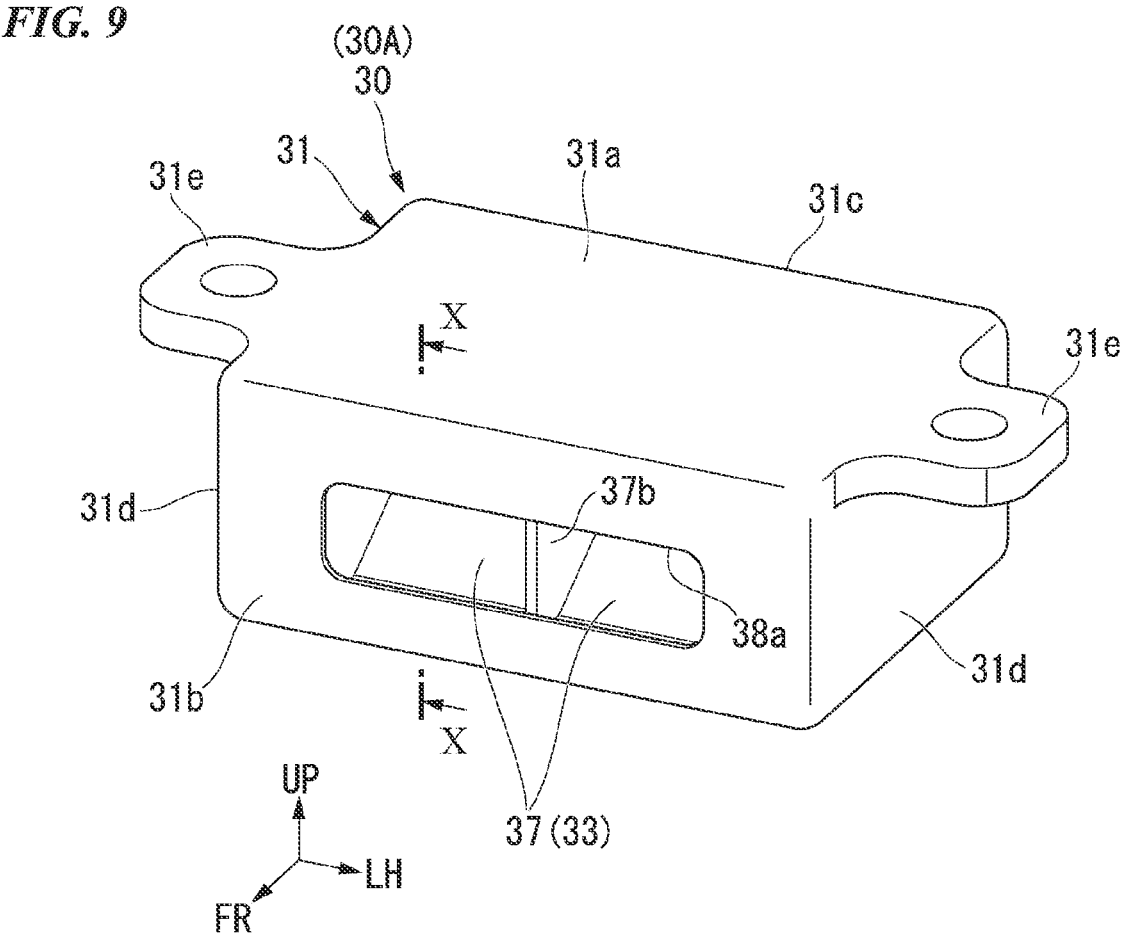
FIG. 9 is a perspective view of the cornering light unit of FIG. 6.
Figure 10:
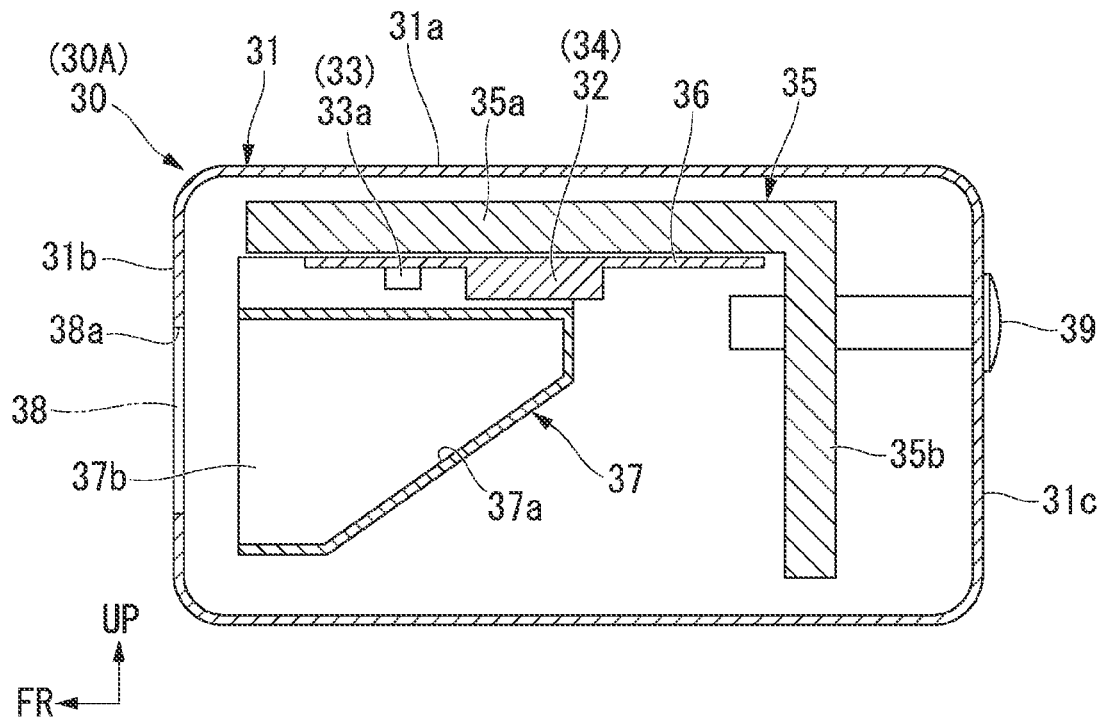
FIG. 10 is a cross-sectional view along line X-X of FIG. 9.

Referring to FIGS. 9 and 10, the cornering light 30 accommodates the bank angle sensor (the acceleration sensor) 32 and a pair of left and right light bodies 33 in the integrated case 31 to form an integrated light unit 30A.

Figure 6:
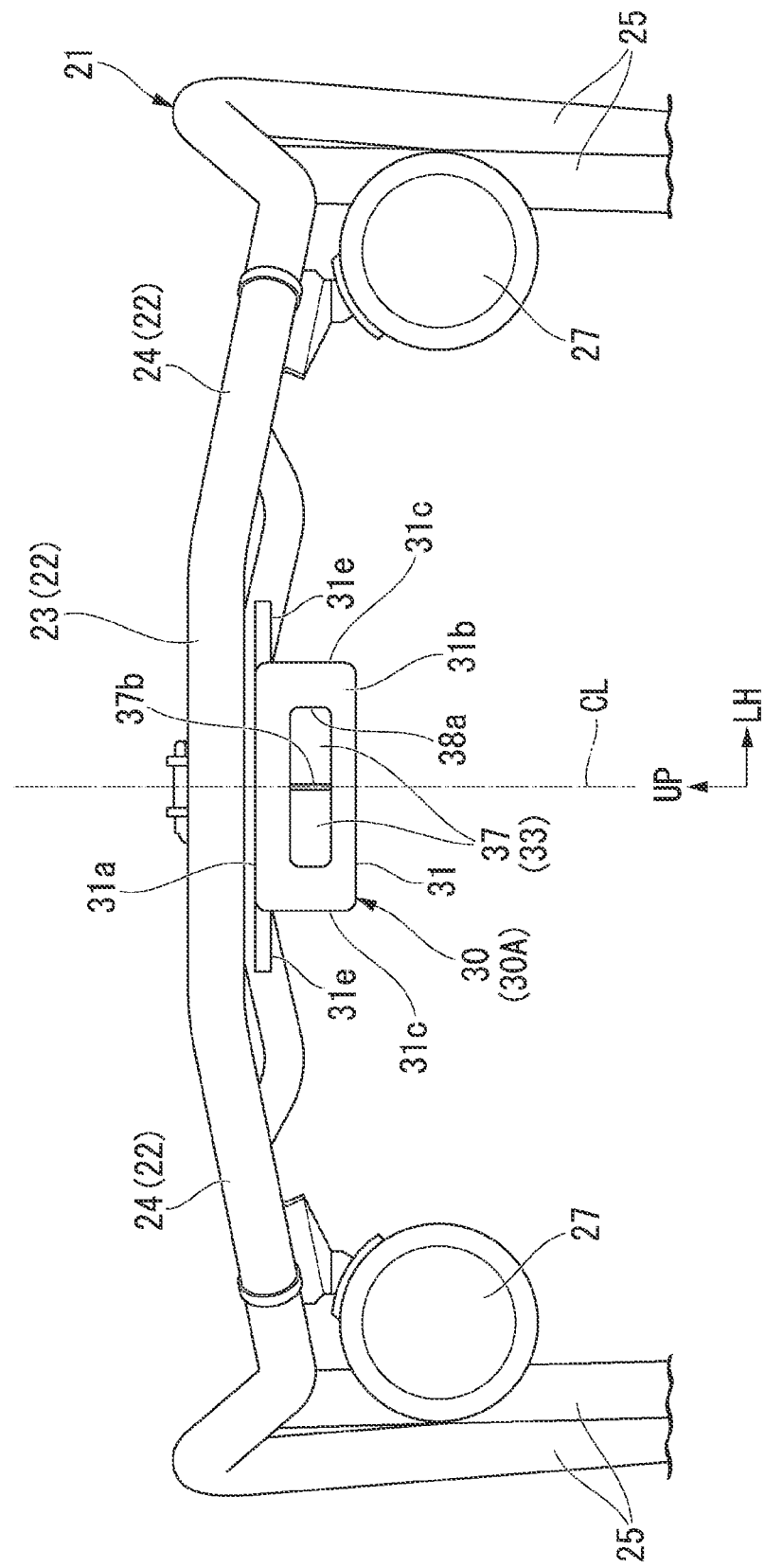
FIG. 6 is a front view showing a specific example of the cornering light unit of the first embodiment, which corresponds to FIG. 2.
Figure 7:
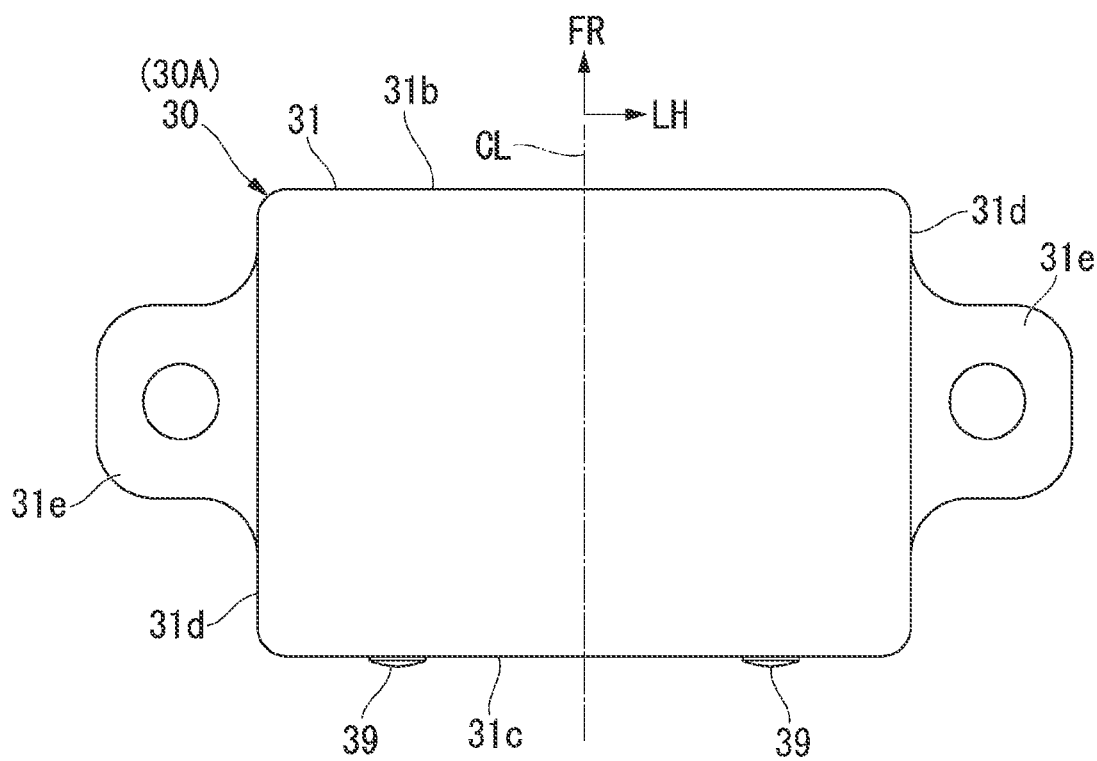
FIG. 7 is a bottom view of the cornering light unit of FIG. 6.
Figure 8:
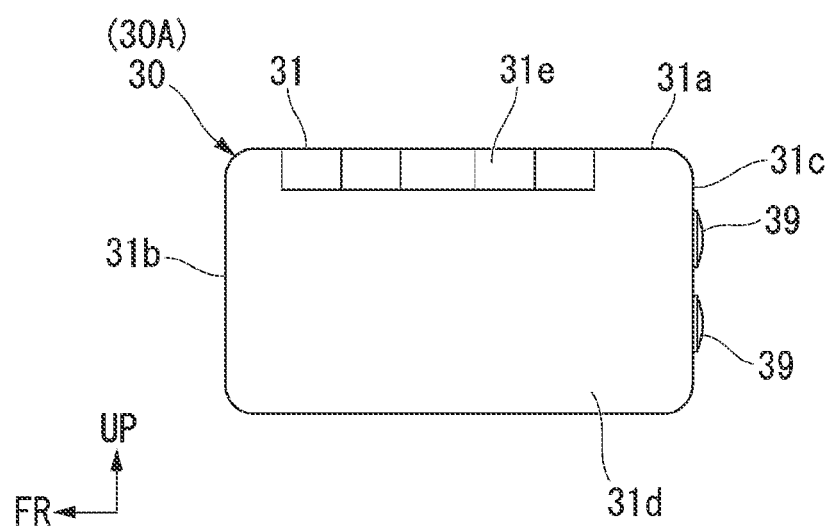
FIG. 8 is a left side view of the cornering light unit of FIG. 6.

Also referring to FIGS. 6 to 8, the case 31 has a flat shape with a reduced vertical thickness and a rectangular parallelepiped outer shape. The case 31 is disposed, for example, with its upper and lower surfaces horizontal and its front and rear surfaces along the left-right direction (the vehicle width direction). Both left and right sides of an upper wall 31a1 forming an upper surface 31a of the case 31 are provided with fixing flanges 31e extending outward in the vehicle width direction from left and right side surfaces 31d of the case 31. The cornering light 30 (the light unit 30A) is attached to a vehicle body component such as the guard pipe 21 using the left and right fixing flanges 31e, bolts (not shown), nuts (not shown), and the like.

Referring to FIG. 10, the case 31 accommodates a bracket 35 for supporting the bank angle sensor 32 and a pair of left and right light bodies 33. The bracket 35 is supported in the case 31 in a floating state. The bracket 35 is formed, for example, in an L shape having an upper wall 35a and a rear wall 35b in a side view. An aiming structure 39 that tilts the bracket 35 and the pair of right and left light bodies 33 to adjust an optical axis is provided between the rear wall 35b of the bracket 35 and a rear wall 31c1 forming a rear surface 31c of the case 31. The aiming structure 39 includes, for example, a pair of aiming bolts or the like spaced vertically and horizontally.

The light unit 30A includes a single electronic board (the same member) 36 on which light sources (for example, LEDs) 33a of the pair of left and right light bodies 33 and the bank angle sensor 32 are mounted. That is, the pair of right and left light bodies 33 and the bank angle sensor 32 share the single electronic board 36. The electronic board 36 may constitute at least a part of the ECU 40 (the cornering determination unit or the like). The bracket 35, the electronic board 36, the light sources 33a, the bank angle sensor 32, and a reflector 37 which will be described later form an integrated unit and are integrally tiltable by the aiming structure 39.

The electronic board 36 is supported on a lower surface side of the upper wall of the bracket 35. Each light source 33a emits light downward. A reflector 37 for distributing the emitted light toward a specified range in front of the vehicle is disposed below the light sources 33a. The reflector 37 is supported by the upper wall 35a of the bracket 35 together with the electronic board 36, for example. As for the reflector 37, for example, reflectors corresponding to the left and right light bodies 33 are integrally provided. In the drawing, reference sign 37a denotes a reflecting surface of the reflector 37, and reference sign 37b denotes a partition wall that partitions the lateral center of the reflector 37 according to the left and right light bodies 33.

An opening 38a is formed in the front wall forming the front surface 31b of the case 31 such that the pair of left and right light bodies 33 can illuminate the front of the vehicle. A lens 38 is attached to the front wall to close the opening 38a. The light emitted from each light body 33 is transmitted through the lens 38 and distributed in front of the vehicle. The lens 38 may or may not have a lens cut.

Effects of the above configuration will be described.

First, the light unit 30A fixes the case 31 to the vehicle body by the left and right fixing flanges 31e of the case 31 being attached to the vehicle body component such as the guard pipe 21. Since the bank angle sensor 32 and the pair of left and right light bodies 33 are supported within the case 31 in a floating manner, the following effects are achieved.

That is, the optical axis of the light unit 20A is adjusted by the bracket 35 being tilted using the aiming structure 39 disposed at the rear portion of the case 31. At this time, the bank angle sensor 32 also moves integrally together with the light body 33 (including the reflector 37). For this reason, when a main body (the case 31) of the light unit 30A is attached to the vehicle body, even if a direction of the light unit 30A deviates from a number line of a completed vehicle, an attaching direction of the bank angle sensor 32 is adjusted according to the alignment of the optical axis. For this reason, it is possible to absorb product variation and attaching variation in the vehicle body component to which the light unit 30A is attached, and even if the light unit 30A is attached to a component whose attaching angle or the like varies to some extent, the output of the bank angle sensor 32 can be stabilized.

Figure 11:
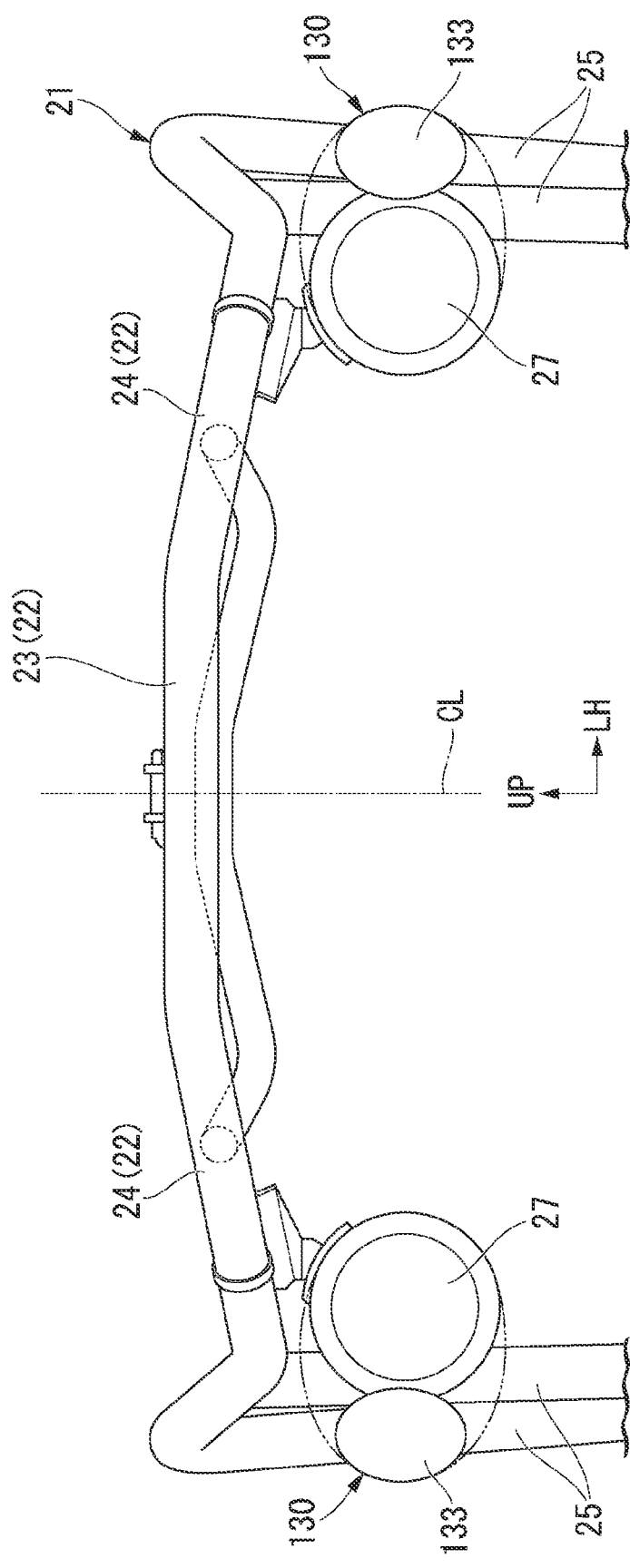
FIG. 11 is a front view of a cornering light unit according to a second embodiment of the present invention.

FIG. 11 shows a cornering light unit 130 according to a second embodiment.

The cornering light 130 of the second embodiment has light bodies 133 separated into left and right. A pair of left and right light bodies 133 are provided integrally with the pair of left and right fog lights 27 supported on both left and right sides of the guard pipe 21. That is, each of the pair of left and right light bodies 133 and each of the fog lights 27 on the same left and right sides are integrated with a housing, and a light source separate from the fog light 27 is provided in the housing. In the second embodiment, the pair of right and left light bodies 133 and the acceleration sensor 32 are separated from each other.

Figure 12:
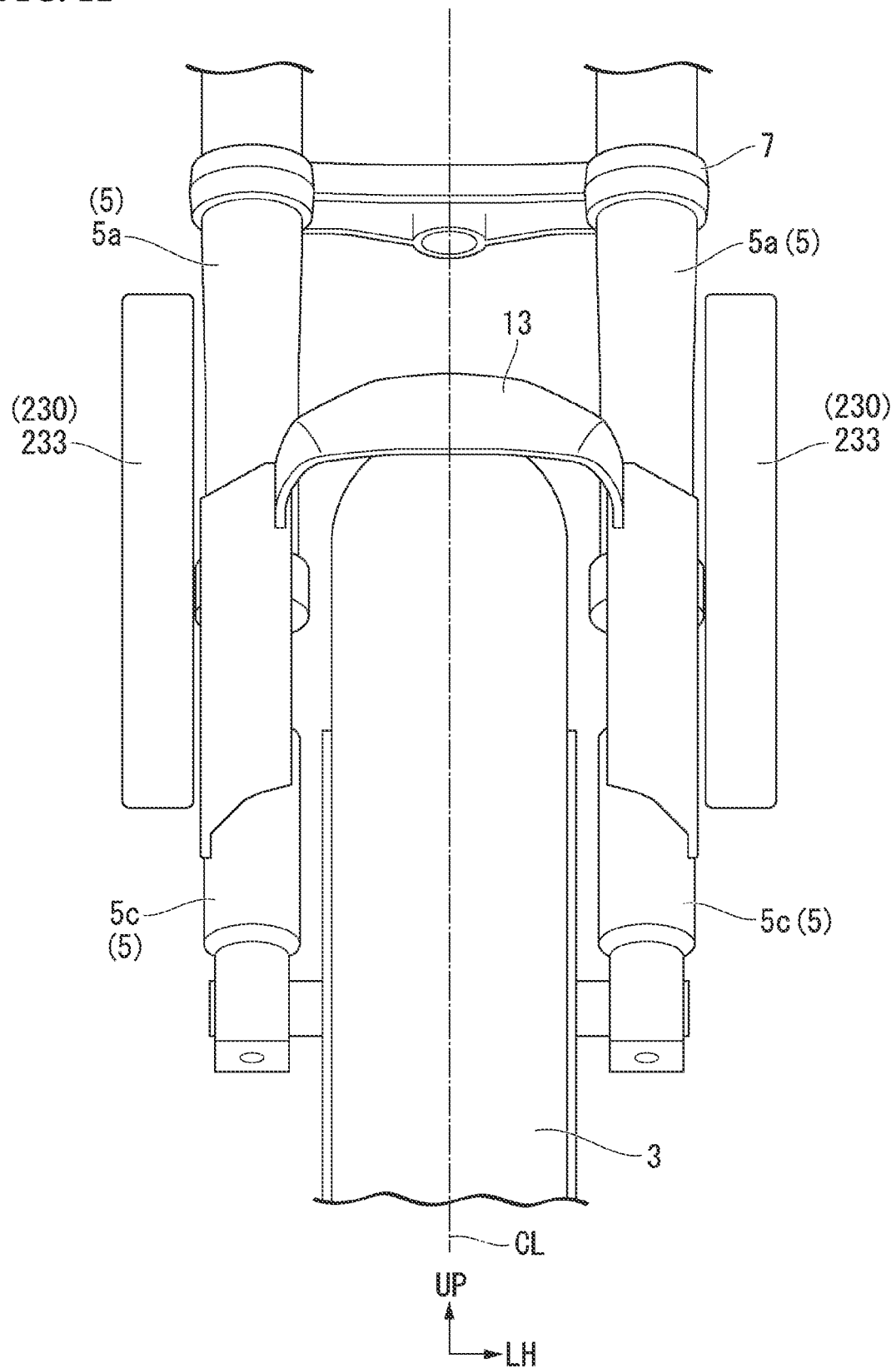
FIG. 12 is a front view of a cornering light unit according to a third embodiment of the present invention.
Figure 13:
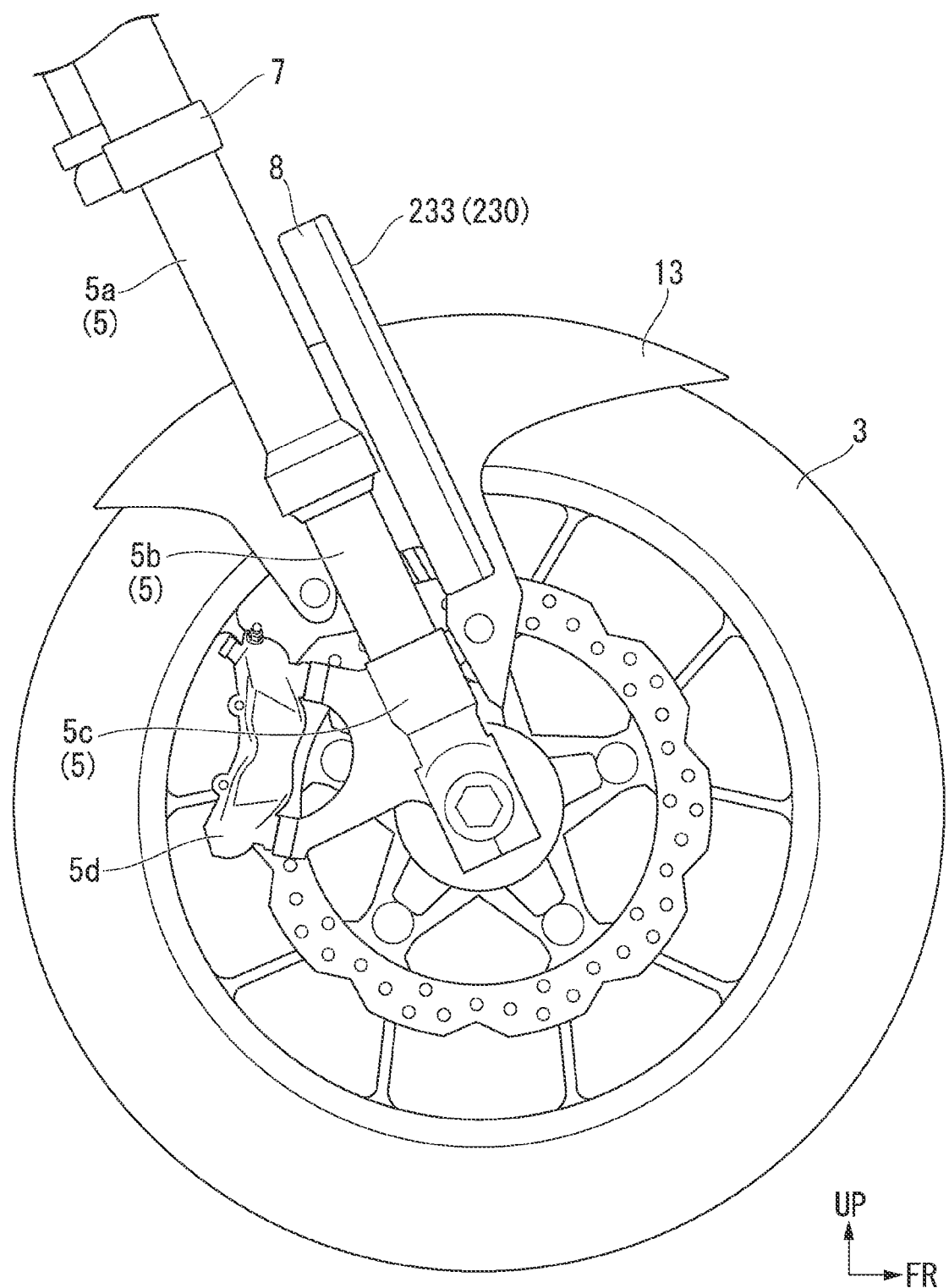
FIG. 13 is a right side view of FIG. 12.

FIGS. 12 and 13 show a cornering light unit 230 according to a third embodiment.

The cornering light 230 of the third embodiment has light bodies 233 separated into left and right as in the second embodiment. A pair of right and left light bodies 233 are disposed on both left and right sides of the front fender 13. Each light body 233 is rotatable around a steering shaft together with the front wheel 3 like the front fender 13. Each light body 233 extends in a longitudinal direction of the front fork 5, for example. The front fender 13 and the pair of left and right light bodies 233 are supported by lower tubular bodies 5b of the telescopic front forks 5.

The front fork 5 shown in FIGS. 12 and 13 is an inverted fork and performs shock absorbing by expanding and contracting an upper tubular body (an outer tube) 5a and a lower tubular body (an inner tube) 5b. A bottom bracket 5c that supports a brake caliper 5d is fixed to the lower end of the lower tubular body (the inner tube) 5b. The front fender 13 and the pair of left and right light bodies 233 are supported by the bottom brackets 5c. In a case where the front fork 5 is an upright fork, the front fender 13 and the pair of left and right light bodies 233 are supported by the outer tubes, which are the lower tubular bodies 5b. The pair of left and right light bodies 233 may be supported by the front fender 13 or its peripheral components (various brackets, a stabilizer, and the like).

In a case where a side reflector (a reflection device) 8 is provided on a side surface of the front fork 5, the side reflector 8 and the light body 233 may be integrated. That is, the side reflector 8 may be attached to a housing of the light body 233.

As another aspect of the cornering light 30, the light body 33 may be supported on both left and right sides of the front cowl 15 (or a cowl support frame) in the motorcycle 1 that does not have the guard pipe 21. The light unit 30A may be supported below the headlight 16 at the lateral center of the vehicle body. The light body 33 may be supported on both left and right sides of the bottom bridge 7.

Referring to FIG. 1, the light bodies 33 may be supported (including integration) by the pair of left and right rearview mirrors 11, the pair of left and right front blinkers 18, the pair of left and right lever guards 12, and the like.

As described above, a cornering light 30 for a saddle-ride type vehicle according to the first embodiment is cornering light which is provided in a motorcycle 1 that performs cornering by a vehicle body being banked laterally and which widens an illumination range in a direction in which the vehicle body is banked during the cornering. The cornering light structure includes a bank angle detection means 34 (an acceleration sensor 32 and an ECU 40) for detecting a bank angle of the vehicle body and a light body 33 that illuminates a range in a direction in which the vehicle body is banked according to the bank angle detected by the bank angle detection means 34. At least the light body 33 of the cornering light 30 is attached separately to a vehicle body component of the saddle-ride type vehicle.

According to this configuration, compared to a configuration in which the cornering light 30 is incorporated in a vehicle body component, retrofitting an optional part is facilitated, and thus an increase in cost can be curbed and expansion to other models can be facilitated.

The above-mentioned "vehicle body component" includes all components exposed to the outside of the vehicle body such as a vehicle body exterior and includes the front cowl 15, the front fender 13, the front fork 5, and the like in addition to the guard pipe 21. The phrase "it is attached separately to the vehicle body part" means that it is attached to the vehicle body part in a retrofitting manner without largely processing the outer surface of the vehicle body component.

In the cornering light 30 of the first embodiment, the light body 33 and the bank angle detection means 34 (the acceleration sensor 32) constitute an integrated light unit and the light unit 30A is attached separately to the vehicle body component.

According to this configuration, the light body 33 and the bank angle detection means 34 constitute the integrated light unit 30A, and thus the cornering light 30 can be easily set as an option and can be easily attached to the vehicle body. The term "integrated" structure only has to be a structure that can maintain an integrated state even if it is a separate body or can be disassembled.

In the cornering light 30 of the first embodiment, the light unit 30A is attached to a lateral center of the vehicle body.

According to this configuration, the bank angle of the vehicle body can be detected efficiently by arranging the light unit 30A including the bank angle detection means 34 at the lateral center of the vehicle body.

In the cornering light 30 of the first embodiment, the light unit 30A has a detection portion (an acceleration sensor 32) of the bank angle detection means 34 at a lateral center of the vehicle body and at least one light body 33 (a light source) on each of the both left and right sides of the detection portion.

According to this configuration, the acceleration sensor 32 of the bank angle detection means is disposed at the lateral center of the vehicle body, and the light bodies 33 are disposed at both left and right sides of the vehicle body, and thus it is possible to efficiently and easily detect the bank angle of the vehicle body, and it is possible to easily illuminate a range in the bank direction of the vehicle body.

In the cornering light 30 of the first embodiment, the motorcycle 1 includes a guard pipe 21 attached separately to the vehicle body, and the light unit 30A is attached to the guard pipe 21.

According to this configuration, by attaching the light unit 30A to the guard pipe 21 which is widely disposed on the outside of the vehicle body, the degree of freedom in the arrangement of the light unit 30A can be increased, the attachment can be facilitated, and the versatility of the cornering light 30 can be enhanced to reduce the cost.

In the cornering light 30 of the second embodiment, a plurality of fog lights 27 are disposed to be distributed on both left and right sides of the vehicle body, a plurality of the light bodies 33 are disposed to be distributed on both left and right sides of the vehicle body, and each of the light bodies 33 is provided integrally with each of the fog lights 27 located on the same left and right sides.

According to this configuration, it is possible to provide the cornering light 30 efficiently by integrating the fog lights 27 on both left and right sides of the vehicle body and the light bodies 33 on both left and right sides of the cornering light 30 with each other.

In the cornering light 30 of the second embodiment, the light body 33 (the fog light 27) is attached to the guard pipe 21.

According to this configuration, by attaching the light body 33 to the guard pipe 21 which is widely disposed on the outside of the vehicle body, the degree of freedom in the arrangement of the light body 33 can be increased, the attachment can be facilitated, and the versatility of the cornering light 30 can be enhanced to reduce the cost. The light body 33 may be attached to the guard pipe 21 separately from the fog light 27.

In the cornering light 30 of the third embodiment, the motorcycle 1 has a front fork 5 between the front wheel 3 and the vehicle body frame, the front fork 5 performs shock absorbing by expanding and contracting the upper tubular body 5a and the lower tubular body 5b, and the light body 33 is attached to the lower tubular body 5b.

According to this configuration, by attaching the light body 33 to the telescopic front fork 5 in which the upper tubular body 5a and the lower tubular body 5b are expanded and contracted, the attachment structure can be easily diverted to different vehicle types, and the versatility of the cornering light 30 can be enhanced to reduce the cost. By attaching the light body 33 to the lower tubular body 5b of the front fork 5, the road surface can be efficiently illuminated.

In the cornering light 30 of the third embodiment, the lower tubular body 5b is provided with a side reflector 8 for reflecting light from the outside, and the cornering light 30 is integrally formed with the side reflector 8.

According to this configuration, when the light body 33 is disposed in the lower tubular body 5b, it is possible to avoid having no place to arrange the side reflector.

The present invention is not limited to the above-described embodiment, and for example, the saddle-ride type vehicle includes all vehicles in which a driver straddles the vehicle body, including a motorcycle (including a bicycle with a prime mover or a scooter type vehicle) as well as a three-wheeled vehicle (including a vehicle having one front wheel and two rear wheels as well as a vehicle having two front wheels and one rear wheel) or a four-wheeled vehicle (a four-wheeled buggy or the like). Further, the saddle-ride type vehicle may be applied to a vehicle that includes an electric motor as a prime mover.

The configuration in the above-described embodiment is an example of the present invention, and various changes can be made without departing from the scope of the present invention, such as replacing the components of the embodiment with the known components.

BRIEF DESCRIPTION OF THE REFERENCE SYMBOLS

1: Motorcycle (saddle-ride type vehicle)
3: Front wheel
5: Front fork (shock absorber)
5a: Upper tubular body
5b: Lower tubular body
8: Side reflector (reflection device)
21: Guard pipe (frame member)
27: Fog light
30: Cornering light
30A: Light unit
32: Acceleration sensor (detection portion)
33: Light body
34: Bank angle detection means
36: Electronic board (same member)

What is claimed is:

1. A cornering light structure for a saddle-ride type vehicle which is provided in the saddle-ride type vehicle that performs cornering by a vehicle body being banked laterally and which widens an illumination range in a direction in which the vehicle body is banked during the cornering, wherein
   a front portion of the vehicle body of the saddle-ride type vehicle is covered with a front cowl,
   the saddle-ride type vehicle has a headlight disposed at a lateral center of a front end portion of the front cowl,
   a guard pipe is provided around the front cowl so as to be disposed along an outer surface of the front cowl,
   a cornering light is configured as an integrated light unit including a bank angle detection means for detecting a bank angle of the vehicle body and a light body that illuminates a range in the direction in which the vehicle body is banked according to the bank angle detected by the bank angle detection means and is independent of the headlight,
   the guard pipe is disposed below the headlight and is a frame member that is separately attached to the vehicle body,
   the guard pipe includes a front pipe portion extending on a front side of the front cowl and a pair of left and right side pipe portions extending on left and right sides of the front cowl, and
   the light unit is attached to the front pipe portion of the guard pipe from below.

2. The cornering light structure for a saddle-ride type vehicle according to claim 1, wherein the light body and the bank angle detection means are attached to a same member.

3. The cornering light structure for a saddle-ride type vehicle according to claim 1, wherein the light unit is attached to a lateral center of the vehicle body.

4. The cornering light structure for a saddle-ride type vehicle according to claim 1, wherein the light unit has a detection portion of the bank angle detection means at a lateral center of the vehicle body and at least one light body on each of both left and right sides of the detection portion.

5. The cornering light structure for a saddle-ride type vehicle according to claim 1,
   wherein the saddle-ride type vehicle includes a frame member attached separately to the vehicle body, and
   wherein the light unit is attached to the frame member.

* * * * *